US008812726B2

(12) United States Patent
Khalid et al.

(10) Patent No.: US 8,812,726 B2
(45) Date of Patent: Aug. 19, 2014

(54) SERVICE INSERTION IN A COMPUTER NETWORK USING INTERNET PROTOCOL VERSION 6 TECHNIQUES

(75) Inventors: Mohamed Khalid, Cary, NC (US);
Ciprian Popoviciu, Raleigh, NC (US);
Patrick Grossetete, Maroussis (FR);
Kenneth Durazzo, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 1188 days.

(21) Appl. No.: 12/207,456

(22) Filed: Sep. 9, 2008

(65) Prior Publication Data

US 2010/0063988 A1  Mar. 11, 2010

(51) Int. Cl.
*G06F 15/16* (2006.01)

(52) U.S. Cl.
CPC ..................................... *G06F 15/16* (2013.01)
USPC .............................. 709/236; 209/232; 209/250

(58) Field of Classification Search
USPC .................................................. 709/220–250
See application file for complete search history.

(56) References Cited

U.S. PATENT DOCUMENTS

| | | | | |
|---|---|---|---|---|
| 2004/0052259 | A1* | 3/2004 | Garcia et al. | 370/392 |
| 2004/0136382 | A1* | 7/2004 | Sundquist | 370/400 |
| 2004/0179508 | A1* | 9/2004 | Thubert et al. | 370/349 |
| 2004/0199666 | A1* | 10/2004 | King et al. | 709/238 |
| 2004/0264465 | A1* | 12/2004 | Dunk | 370/392 |
| 2005/0251582 | A1* | 11/2005 | Goel et al. | 709/238 |
| 2006/0209885 | A1* | 9/2006 | Hain et al. | 370/465 |
| 2008/0181216 | A1* | 7/2008 | Breau et al. | 370/389 |
| 2010/0074256 | A1* | 3/2010 | Seok et al. | 370/392 |
| 2010/0172302 | A1* | 7/2010 | Dunk | 370/328 |

OTHER PUBLICATIONS

Deering, et al., Internet Protocol, Version 6 (IPV6) Specification. Network Working Group. Published by the Internet Engineering Task Force [online]. Dec. 1998 [retrieved on Oct. 7, 2008]. pp. 1-37. Retrieved from the Internet: <URL:http://www.ietf.org/rfc/rfc2460.txt>.
IPv6. Wikipedia, the free encyclopedia[online]. Published by Wikipedia. [retrieved on Oct. 7, 2008]. pp. 1-14. Retrieved from the Internet: <URL: http://en.wikipedia.org/wiki/IPv6>.
Kent, et al., IP Authentication Header. Network Working Group. Published by the Internet Engineering Task Force [online]. Nov. 1998 [retrieved on Oct. 7, 2008]. pp. 1-13. Retrieved from the Internet: <URL:http://www.ietf.org/rfc/rfc2402.txt>.
Rose. Mapping the BEEP Core onto TCP. Network Working Group. Published by RFC Editor [online]. Mar. 2001 [retrieved on Oct. 7, 2008]. pp. 1-8. Retrieved from the Internet: <URL:http://www.rfc-editor.org/rfc/rfc3081.txt>.

* cited by examiner

*Primary Examiner* — Viet Vu
*Assistant Examiner* — Keyvan Emdadi
(74) *Attorney, Agent, or Firm* — Hickman Palermo Truong Becker Bingham Wong LLP

(57) ABSTRACT

Apparatus, methods and computer programs enable carrying service insertion architecture data plane packets in IPv4 or IPv6 networks by packaging destination addresses using IPv6 mechanisms. For example, a data processing apparatus is configured for receiving, from a service broker, a service label and an Internet Protocol version 6 (IPv6) address of a first service node; receiving an IPv4 packet requesting a service associated with the first service node; creating an IPv6 packet comprising a service label in a Flow Label field of the IPv6 packet, the IPv6 address of the first service node in a destination address field of the IPv6 packet, and the IPv4 packet in a payload field of the IPv6 packet; forwarding the IPv6 packet to the first service node. Approaches allow service insertion architecture support for all-IPv6 traffic including tunneled and non-tunneled techniques for environments in which user applications place data in the flow label field.

23 Claims, 7 Drawing Sheets

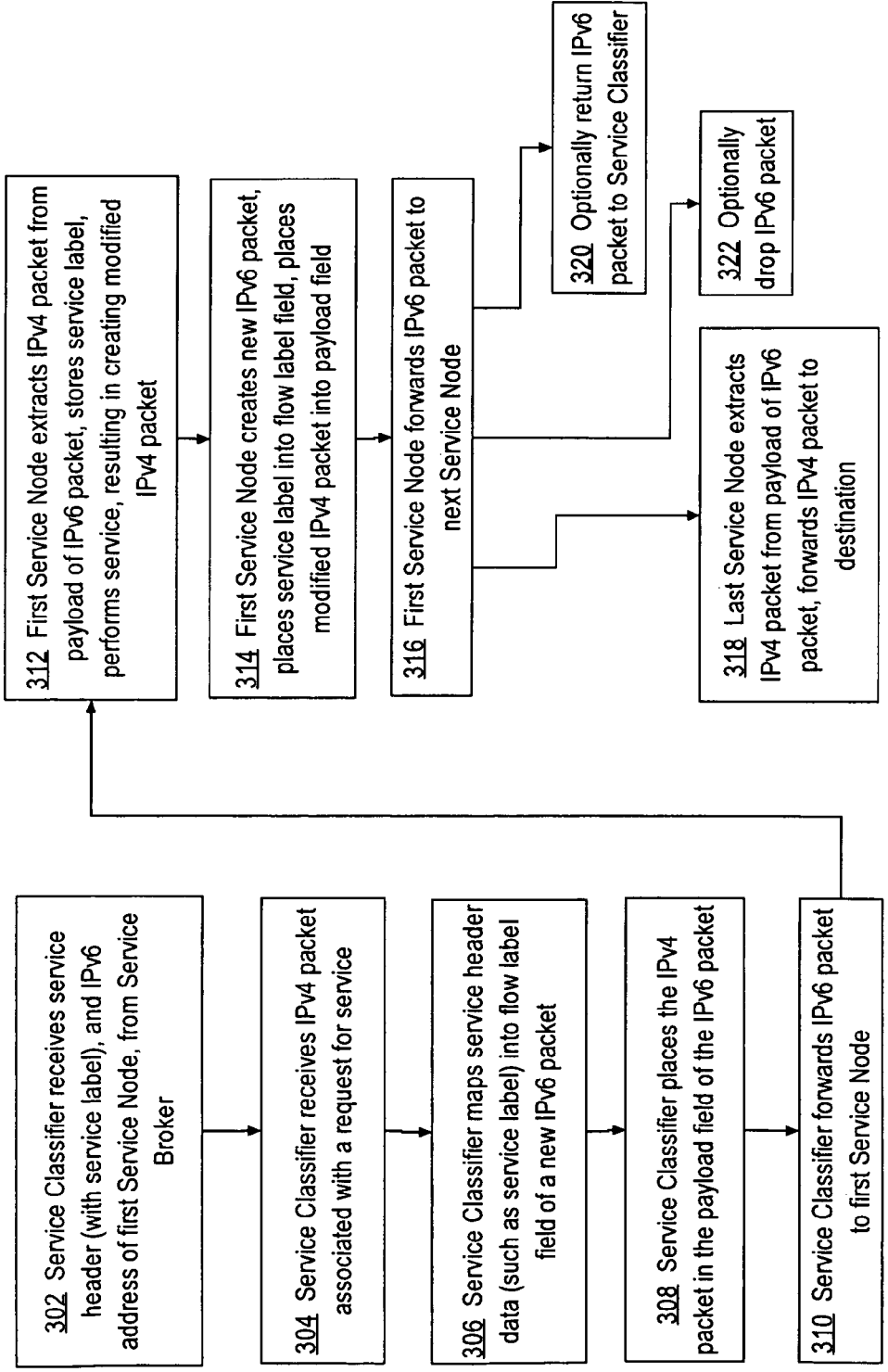

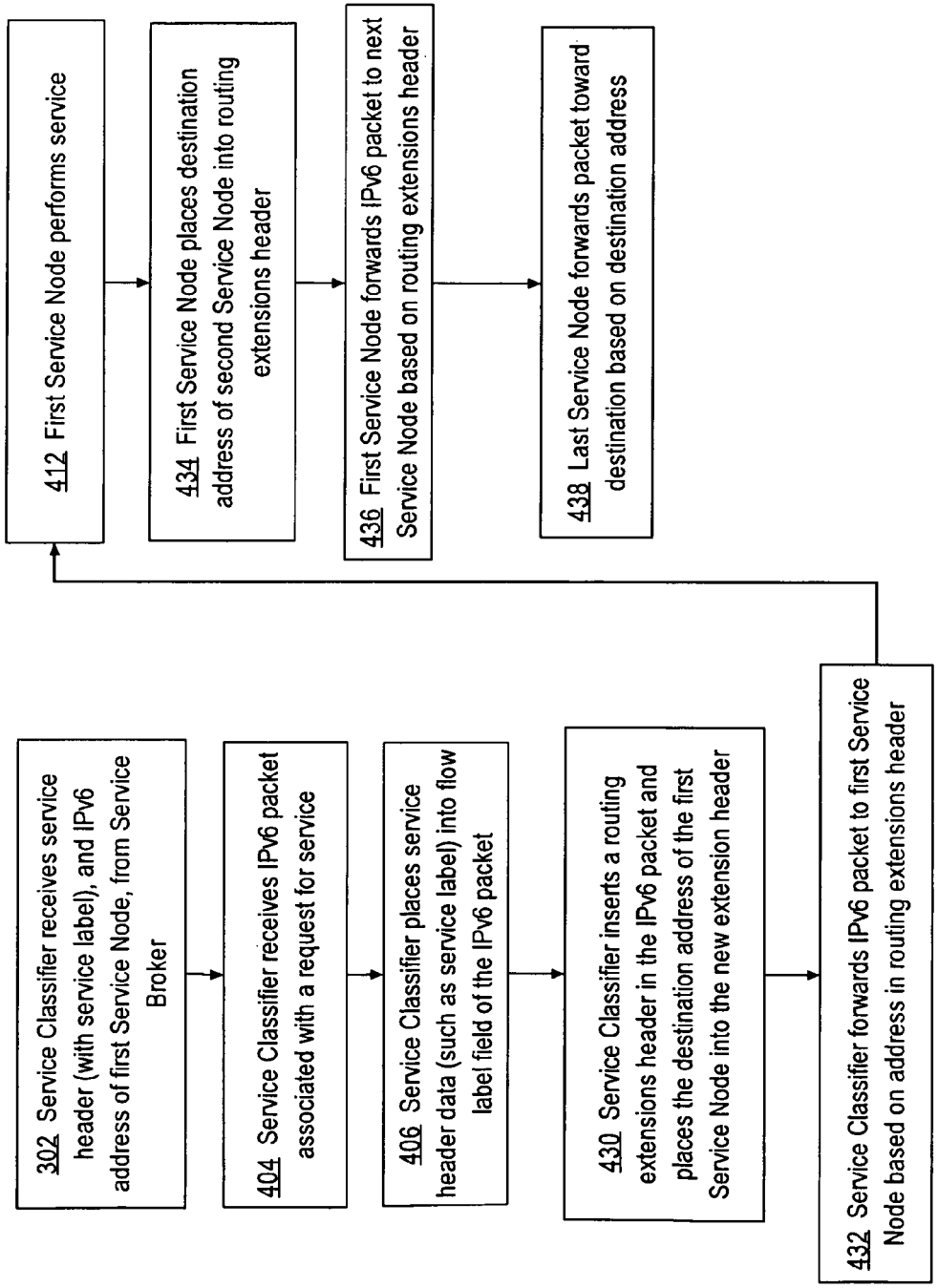

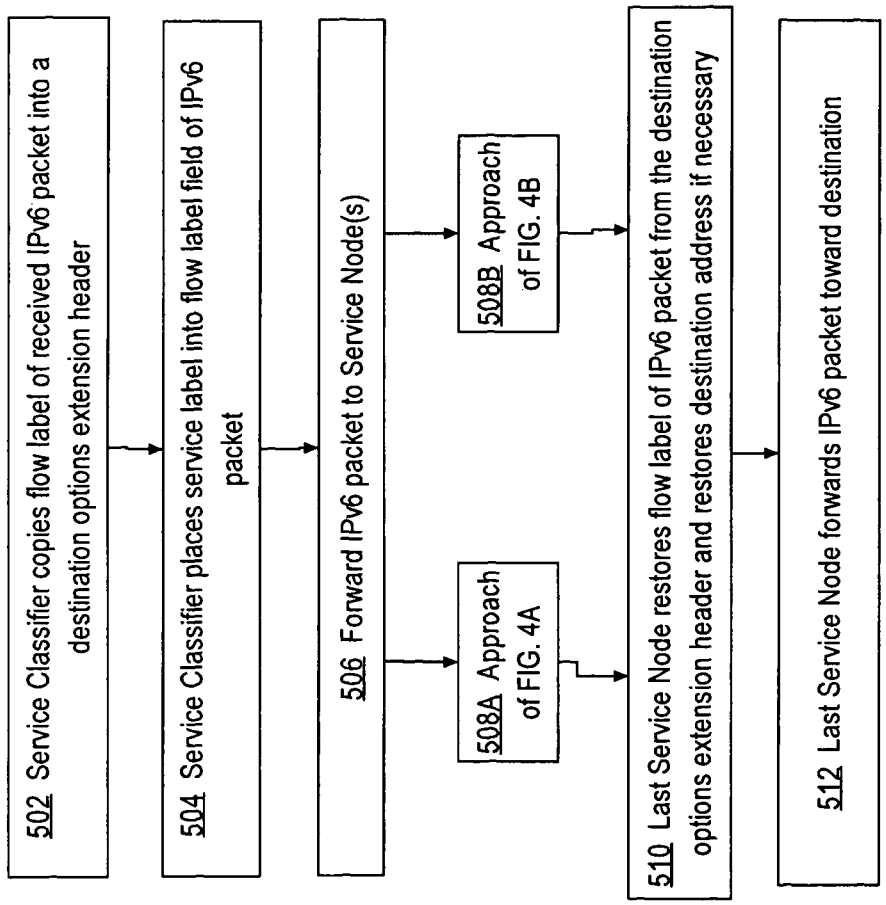

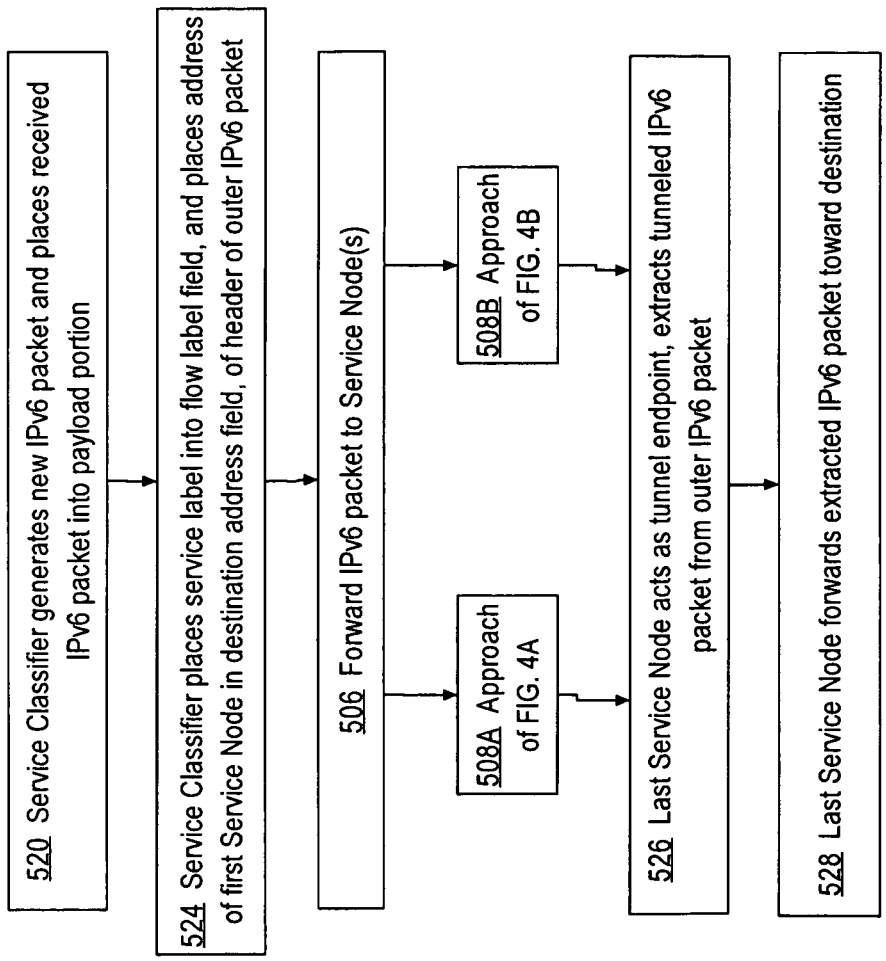

US 8,812,726 B2

SERVICE INSERTION IN A COMPUTER NETWORK USING INTERNET PROTOCOL VERSION 6 TECHNIQUES

TECHNICAL FIELD

The present disclosure generally relates to computer networks. The disclosure relates more specifically to processing service requests in a network that uses Internet Protocol version 6 (IPv6).

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a data communications network configured according to the Service Insertion Architecture of Cisco Systems, Inc., San Jose, Calif., a Service Broker node provides a Service Classifier node with a service header and a corresponding next hop node that can provide a specified service. The Service Classifier attaches the header to a packet that needs to be serviced and then tunnels the packet to the next hop node. As a result, packets can receive complex services using a network of service nodes not strictly known to the sender of the packets. The architecture can be deployed in an Internet Protocol version 4 (IPv4) network and there is no present approach to use IP version 6 (IPv6) or to address particular problems that the IPv6 packet format introduces.

IPv4 and IPv6 are defined in numerous Request for Comments (RFC) publications of the Internet Engineering Task Force, such as RFC 2460, which is the basic IPv6 specification. RFC publications are available on the World Wide Web at the domain ietf.org.

BRIEF DESCRIPTION OF THE DRAWINGS

In the drawings:

FIG. 3 illustrates providing SIA data plane support for Internet Protocol version 4 (IPv4) traffic.

FIG. 4B illustrates providing SIA data plane support for IPv6 traffic, in a second embodiment.

FIG. 5A illustrates packet processing for IPv6 traffic when the flow label is used by a user application, in a first embodiment.

FIG. 5B illustrates packet processing for IPv6 traffic when the flow label is used by a user application, in a second embodiment.

DETAILED DESCRIPTION

Figure 1:
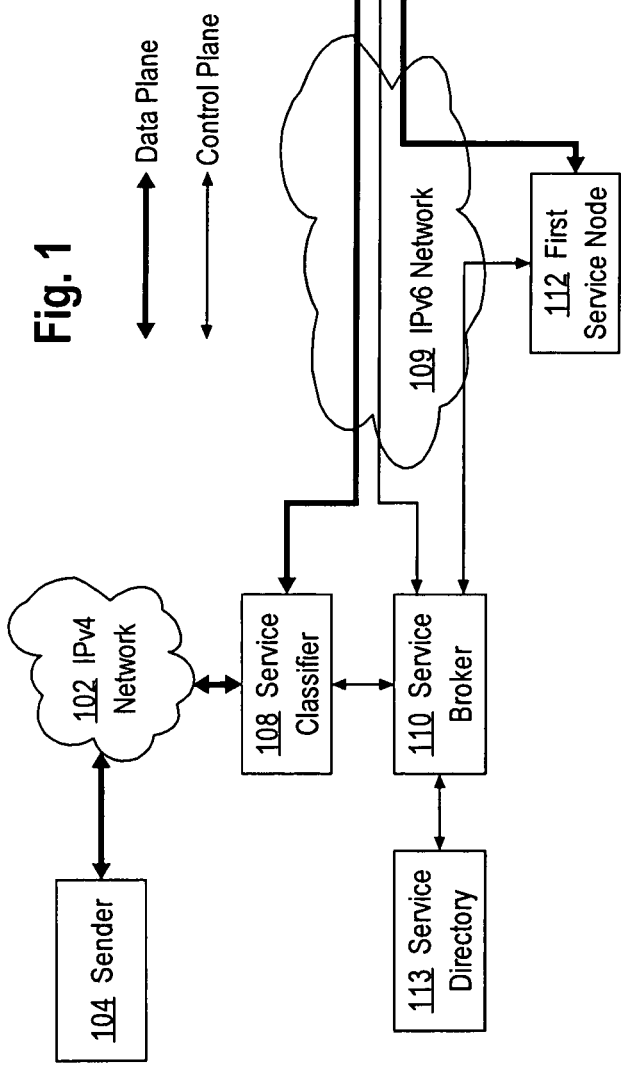
FIG. 1 illustrates a network having nodes based on a Service Insertion Architecture (SIA).

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
 1.0 General Overview
 2.0 Service Insertion Using IPv6 Techniques
  2.1 Structural and Functional Overview
  2.2 Providing Data Plane Support for Internet Protocol Version 4 (IPv4) Traffic
  2.3 Providing Data Plane Support for IPv6 Traffic
  2.4 Packet Processing for IPv6 Traffic When User Applications Are Using the Flow Label
 3.0 Implementation Mechanisms—Hardware Overview
 4.0 Extensions and Alternatives
 1.0 General Overview Apparatus, methods and computer programs enable carrying service insertion architecture data plane packets in IPv4 or IPv6 networks by packaging destination addresses using IPv6 mechanisms. For example, a data processing apparatus is configured for receiving, from a service broker, a service label and an Internet Protocol version 6 (IPv6) address of a first service node; receiving an IPv4 packet requesting a service associated with the first service node; creating an IPv6 packet comprising a service label in a Flow Label field of the IPv6 packet, the IPv6 address of the first service node in a destination address field of the IPv6 packet, and the IPv4 packet in a payload field of the IPv6 packet; forwarding the IPv6 packet to the first service node. Approaches allow service insertion architecture support for all-IPv6 traffic including tunneled and non-tunneled techniques for environments in which user applications place data in the flow label field.

In an embodiment, a computer-readable data storage medium stores one or more sequences of instructions which when executed by one or more processors cause the one or more processors to perform receiving, from a service broker, a service label and an Internet Protocol version 6 (IPv6) address of a first service node; receiving, from a network node that uses Internet Protocol version 4 (IPv4), an IPv4 packet requesting a service associated with the first service node; creating an IPv6 packet comprising a service label in a Flow Label field of the IPv6 packet, the IPv6 address of the first service node in a destination address field of the IPv6 packet, and the IPv4 packet in a payload field of the IPv6 packet; and forwarding the IPv6 packet to the first service node.

In an embodiment, further instructions cause: at the first service node: extracting the IPv4 packet; performing the service using the IPv4 packet, resulting in creating a modified IPv4 packet; creating a second IPv6 packet comprising the service label in a Flow Label field of the second IPv6 packet, a second IPv6 address of a second service node in a destination address field of the second IPv6 packet, and the modified IPv4 packet in a payload field of the second IPv6 packet; and forwarding the second IPv6 packet to the second service node, or forwarding the second IPv6 packet to a service classifier, or dropping the second IPv6 packet.

In an embodiment, the approach involves receiving, from a service broker, a service label and an Internet Protocol version 6 (IPv6) address of a first service node; receiving an IPv6 packet requesting a service associated with the first service node; modifying the IPv6 packet by placing the service header data in a Flow Label field of the IPv6 packet and by redirecting a destination address of the IPv6 packet; forwarding the IPv6 packet to the first service node.

In an embodiment, the instructions for modifying by redirecting the destination address further comprise instructions to perform inserting a destinations option extension header, placing a destination address of the IPv6 packet in the destinations option extension header, and placing the IPv6 address of the first service node in a destination address field of the IPv6 packet. In one feature, the approach further includes, at the first service node: performing the service using the IPv6 packet, resulting in creating a modified IPv6 packet; placing a second IPv6 address of a second service node in the destination address field of the modified IPv6 packet; forwarding the modified IPv6 packet to the second service node; at the second service node: moving the destination address of the IPv6 packet from the destinations option extension header to the destination address field of the IPv6 packet; forwarding the IPv6 packet to a destination node identified by the destination address.

In an embodiment, the instructions for modifying by redirecting the destination address further comprise instructions to perform inserting a routing extension header comprising the IPv6 address of the first service node.

Alternative approaches may be used when the IPv6 flow label is used by a user application. In one embodiment, the approach comprises creating, in the IPv6 packet, a destination options extension header and copying a flow label value from the flow label field into the destination options extension header; at a last service node: copying the flow label value from the destination options extension header into the flow label field and forwarding the IPv6 packet to the destination address. In another embodiment, the approach comprises creating an additional IPv6 packet for use in tunneling the IPv6 packet; placing the service label in a flow label field of a header of the additional IPv6 packet; placing the destination address of the first service node in a destination address field of the header of the additional IPv6 packet.

In other embodiments, the invention encompasses a computer apparatus and a computer-implemented method configured to implement the preceding approaches 2.0 Service Insertion Using IPv6 Techniques 2.1 Structural and Functional Overview FIG. 1 illustrates a network having nodes based on a Service Insertion Architecture (SIA). A sender 104 is coupled to an Internet Protocol (IP) version 4 (IPv4) network 102, which is also coupled to a Service Classifier 108. An IP version 6 (IPv6) network 109 is coupled to the Service Classifier 108, a Service Broker 110, a first Service Node 112, and a second Service Node 114. The Service Broker 110 is coupled to a Service Directory 113.

In an embodiment, sender 104 comprises a computer configured as an end user station, server, or other end station, or as a network infrastructure element such as a router, switch, etc. The IPv4 network 102 comprises one or more local area networks, wide area networks, internetworks, or any combination thereof that use IPv4 packet format and protocols for data communication.

In an embodiment, each of the Service Classifier 108, Service Broker 110, first Service Node 112, and second Service Node 114 comprise elements of a Service Insertion Architecture (SIA) of an enterprise network or a service provider network. Each element has a distinct role within the architecture. For example, the Service Classifier 108 performs initial classification and service header insertion. Service Directory 113 maintains directory information. Service Broker 110 is responsible for inter-component data exchanges. Service Nodes 112, 114 delivers the actual service(s).

A control plane represented in FIG. 1 by designated arrows performs several tasks. For example, the control plane involving a Service Node to the Service Broker provides:

Point-to-point communication.

Register services: service nodes register their services with the service broker. A service node can have several services—or instances of service(s).

Exchange service information: service nodes advertise, to the Service Broker, a list of parameters including service description, service type, load, etc. The Service Broker shares this information between participating service nodes to ensure that each node has a complete view of the service topology.

De-register services: upon service shutdown or failure, the control plane informs the Service Broker, which in turn informs other Service Nodes, that a given service or services has been removed.

Update service status: service status is not necessarily static. The control plane informs the Service Broker about changing status of a service such as load parameters.

Service header to chain binding: to process chained data plane packets, the Service Nodes are informed by the Service Broker about a mapping of a service header to a service. For example, if a service header "100" denotes firewall(SN1)→IPS(SN2), the mapping of "100" to the specified service is shared with all nodes that participate in a given chain.

The control plane involving a Service Classifier and Service Broker provides:

Point to point communication.

The Service Classifier 108 requests the Service Broker 110 for "service-participation" based on a configured namespace. In response to this request, the Service Broker returns a service header and one or more addresses of next-hops. The next-hop(s) represent the first hop into the service topology, namely the data plane address of the first service node(s). The Service Classifier 108 does not interact with the Service Nodes 112, 114 directly, nor does the Service Classifier need to accept information directly from Service Nodes.

Failover and updates: the control plane session between the Service Classifier 108 and the Service Broker 110 is also used for updating or withdrawing service header and/or next-hop information. For example, if a service becomes unavailable, the Service Broker informs the appropriate Service Classifiers that a service header and next-hop is no longer valid.

Load distribution: the Service Broker can allocate headers and associated next-hops in an intelligent manner providing load distribution. For instance, round robin allocation of next-hops to multiple instances the same service for load balancing.

In an embodiment, the data plane is used after the Service Classifier 108 has received a service header and next-hop value. With this information, the Service Classifier 108 classifies the packet and once classified, places the header on a packet to be serviced, then encapsulates the original packet and the header in an outer tunnel header for delivery to a next-hop, as returned by the Service Broker 110 via the control plane. The Service Classifier delivers packets to the next-hop according to the Service Classifier's configuration and view of the network.

After de-encapsulating and processing the ingress packet, the first Service Node 112 re-encapsulates the packet, adding the service header (if the header was popped during service processing) and sends the packet to the next Service Node 114 in the chain. The data plane location of the next service node was previously communicated to the first Service Node 112 using the control plane.

In an embodiment, the control plane provides:

Reliable Transport: an existing reliable transport may be used.

Authentication: strong peer authentication may be used.

Encryption: encryption may be supported.

Extensible and portable: The control plane may be open and extensible, allowing services to participate in the infrastructure.

The control plane may be usable in both enterprise and service provider environments.

Topologically independent: The control plane need not understand the network topology and may allow participating devices to maintain local topology information and to forward packets based on that information.

In an embodiment, the control plane is implemented as a protocol that runs over TCP, using Blocks Extensible Exchange Protocol (BEEP). In an embodiment, over a BEEP channel, XML data is used to carry service information. In other embodiments, Border Gateway Protocol BGP or an interior gateway protocol (IGP) may be adapted to provide a control plane.

Accordingly, in operation, Service Broker 110 provides Service Classifier 108 with a service header and a corresponding next hop node that can provide a specified service. The Service Classifier 108 attaches the header to the packet that has to be serviced and then tunnels it to the provided next hop. The Service Classifier 108 thus acts as the first entry point for a packet into an SIA network and comprises the edge of a service domain. As seen in FIG. 1, packets originating from Sender 104 or elsewhere in IPv4 network 102 reach the Service Classifier 108 before entering the IPv6 network 109.

In an embodiment, any number of Service Classifier 108 nodes may be used, depending on factors such as traffic volume, number of different services implemented, etc. In an embodiment, Service Broker 110 and Service Classifier 108 may be implemented using the same physical computer. Additionally or alternatively, Service Broker 110 and Service Classifier 108 may be implemented using the same computer program. In an embodiment, Service Broker 110 only participates in control plane operations. Each of the Service Nodes 112, 114 contacts the Service Broker 110 to register services and receive, from the Service Broker, information about domain-wide services and service header to service mapping.

In an embodiment, each of the Service Nodes 112, 114 performs a particular service on or for a packet and participates in both the control plane (with the Service Broker 110) and the data plane (with the Service Classifier 108). For purposes of illustrating a clear example, FIG. 1 shows two Service Nodes 112 and 114; however, other embodiments may use any number of Service Nodes. Service Nodes may operate in a chained configuration. For example, the first Service Node 112 performs a particular service and then provides the results to a second Service Node 114. Any number of Service Nodes may be configured in a chain.

The Service Classifier 108, as part of registering with the Service Broker 110, receives from the Service Broker a Service Label and an address of a next hop node, in IPv6 format. In an embodiment, network 109 comprises a core network of an enterprise or service provider. IPv6 connectivity for end users is not required in embodiments.

Figure 2:
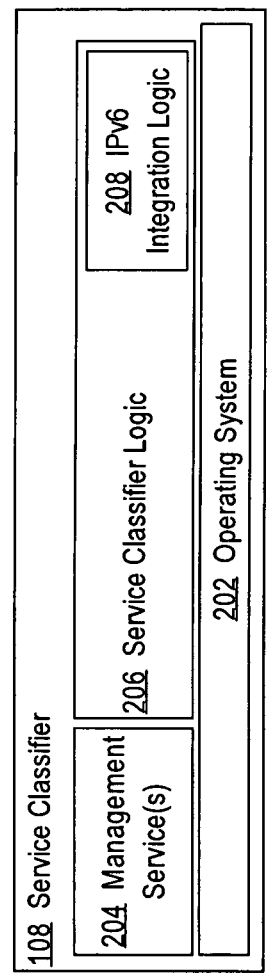
FIG. 2 illustrates a logical architecture of a Service Classifier node.

FIG. 2 illustrates a logical architecture of a Service Classifier node. In an embodiment, Service Classifier 108 or another Service Classifier node comprises an operating system 202, management service(s) 204, and service classifier logic 206. In an embodiment, operating system 202 comprises one or more elements of hardware, firmware, software, or a combination thereof, implementing resource management functions for a computer that hosts the Service Classifier 108, network protocols, and internetworking applications. For example, operating system 202 implements packet routing, forwarding, and/or switching decisions and functions. In an embodiment, operating system 202 comprises Cisco IOS® Software, commercially available from Cisco Systems, Inc., San Jose, Calif.

In an embodiment, management service(s) 204 implement one or more management functions associated with the Service Classifier 108. For example, management service(s) 204 may comprise logic implementing simple network management protocol (SNMP) or other functions.

In an embodiment, service classifier logic 206 implements operational functions as described herein. In an embodiment, service classifier logic 206 includes IPv6 integration logic 208, which comprises one or more elements of hardware, firmware, software, or a combination thereof, implementing the functions of any one or more of FIG. 3, FIG. 4A, FIG. 4B, FIG. 5A, FIG. 5B as described and illustrated herein.

2.2 Providing SIA Data Plane Support for Internet Protocol Version 4 (IPv4) Traffic using Version 6 Techniques FIG. 3 illustrates providing SIA data plane support for Internet Protocol version 4 (IPv4) traffic. In the approach of FIG. 3, IPv6 infrastructure is used to transport IPv4 traffic from one Service Node 112 to another to result in complete processing of a packet. The same IPv6 infrastructure can be used for delivering SIA functionality to both IPv4 and IPv6 traffic.

For purposes of illustrating a clear example, FIG. 3 is described in the context of the structure of FIG. 1, FIG. 2. However, the broad approaches of FIG. 3 may be implemented using network topologies, arrangements, and architectures other than as shown in FIG. 1, FIG. 2. For example, functional units other than the Service Classifier could perform the processing described in FIG. 3 for the Service Classifier, and the order of certain processing steps could be changed.

As shown at block 302, for each service, the Service Classifier 108 receives from the Service Broker a service header containing a service label, and also receives the IPv6 address of a first Service Node that can provide a particular service. At block 304, the Service Classifier 108 receives an IPv4 packet associated with a request for service or needing a service applied to it.

In block 306, the Service Classifier maps the service header information into the Flow Label of the main IPv6 packet header which has the first Service Node for that service as the packet destination. For example, the Service Classifier places the service label into the Flow Label field. In block 308, the Service Classifier also places the IPv4 packet in the IPv6 packet payload field. At block 310, the Service Classifier forwards the IPv6 packet towards the first Service Node.

The same steps are followed by each Service Node after they processed the IPv4 packet and before sending it via IPv6 to the next Service Node. The last Service Node can return the IPv4 packet, via IPv6, to the Service Classifier or it can drop it in the network. For example, in block 312, the first Service Node extracts the IPv4 packet from the payload of the IPv6 packet, stores the service label, and performs the service, resulting in creating a modified IPv4 packet. At block 314, the first Service Node creates a new IPv6 packet, places the service label into the Flow Label field, and places the modified IPv4 packet into the payload field. The first Service Node then forwards the IPv6 packet to the next Service Node.

At block 318, the last Service Node extracts the IPv4 packet from the payload of the IPv6 packet and forwards the IPv4 packet toward a destination in an IPv4 network. If the destination is in an IPv6 network, then the last Service Node can form an IPv6 packet that contains the same payload contents as the IPv4 packet and forward the IPv6 packet instead.

Optionally, the last Service Node can return the IPv6 packet to the Service Classifier as seen in block 320, or drop the IPv6 packet as stated in block 322.

With this approach no special label needs to be developed and transport is simplified. The packet exchange can be secured if needed using IPv6 mechanisms.

Figure 4A:
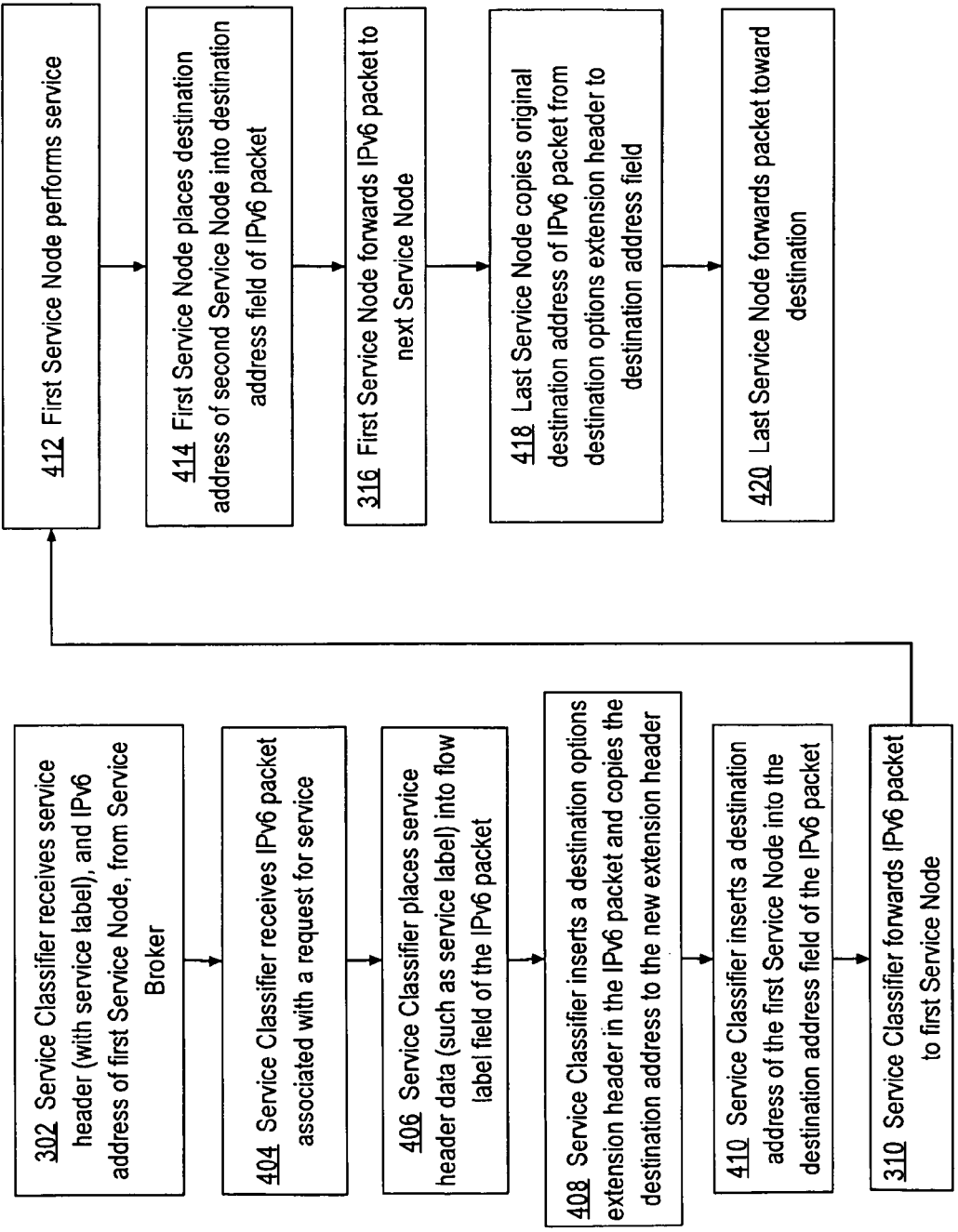
FIG. 4A illustrates providing SIA data plane support for IPv6 traffic, in a first embodiment.

2.3 Providing SIA Data Plane Support for Internet Protocol Version 6 (IPv6) Traffic FIG. 4A illustrates providing SIA data plane support for IPv6 traffic, in a first embodiment. In an environment in which users are not using the flow label for applications, the flow label field of the actual user traffic can be used to carry the service label. In a first approach, the Service Classifier inserts the service label in the packet header flow label field. The Service Classifier also changes the destination IPv6 address to that of the Service Node while inserting a destination options extension header that carries the original destination IPv6 address. Each Service Node changes the destination address value to direct the packet to the next Service Node while keeping the flow label and the destination options unchanged. The last Service Node, once it processes the packet, places the address from the destinations options in the destination address of the main header.

In the approach of FIG. 4A, IPv6 infrastructure is used to transport traffic from end-to-end. For purposes of illustrating a clear example, FIG. 4A is described in the context of the structure of FIG. 1, FIG. 2. However, the broad approaches of FIG. 4A may be implemented using network topologies, arrangements, and architectures other than as shown in FIG. 1, FIG. 2. For example, functional units other than the Service Classifier could perform the processing described in FIG. 4A for the Service Classifier, and the order of certain processing steps could be changed.

As shown at block 302, for each service, the Service Classifier 108 receives from the Service Broker a service header containing a service label, and also receives the IPv6 address of a first Service Node that can provide a particular service. At block 404, the Service Classifier 108 receives an IPv6 packet associated with a request for service or needing a service applied to it.

In block 406, the Service Classifier places service header information into the Flow Label of the header of the IPv6 packet that was received. For example, the Service Classifier places a service label into the Flow Label field. In block 408, the Service Classifier inserts into the IPv6 packet a destination options extension header, and copies the destination address of the original packet into the new destination options extension header.

At block 410, the Service Classifier inserts a new destination address, for the first Service Node, into the destination address field of the original IPv6 packet. At block 310, the Service Classifier forwards the IPv6 packet towards the first Service Node. As a result, the original destination address effectively has been saved in a recoverable location and a new address of a service node has been substituted as the destination.

Similar steps are performed at downstream service nodes. For example, at block 412, the first Service Node receives the packet and performs the requested service. At block 414, the first Service Node creates a new IPv6 packet, and places the destination address of a second service node into the destination address field of the packet. At block 316, the first Service Node forwards the IPv6 packet to the next Service Node.

At block 418, the last Service Node copies the original destination address of the IPv6 packet from the destination options extension header into the destination address field of a new IPv6 packet. At block 420, the last Service Node forwards the packet toward the destination.

The value of this implementation is that no tunneling is being used and since the destination options extension header is a constant, there is no impact on payload check-sum calculation. In IPv6 there is no check-sum for the main header so the changes made to the main header as the packet goes from one Service Node to the other do not require added processing.

In the description above, the term "new IPv6 packet" is used. In alternative embodiments, a received packet may be stored temporarily in a local data store, modified by changing or overwriting fields, and transmitted. Thus, in certain embodiments, there may be no distinction made between a received packet and a forwarded packet in terms of data storage, and actually allocating memory or otherwise newly creating a data packet is not required in an embodiment.

FIG. 4B illustrates providing SIA data plane support for IPv6 traffic, in a second embodiment. Generally, the process of FIG. 4B is similar to FIG. 4A. However, in FIG. 4B the Service Classifier inserts the service label into the flow label field of the IPv6 packet header and also inserts a routing extension header, which indicates that despite the destination IPv6 address in its main header, the real next hop for the packet is the first Service Node.

Referring now to FIG. 4B, blocks 302, 404, and 406 are performed as described above for FIG. 4A. In block 430, the Service Classifier inserts a routing extensions header into the received IPv6 packet and places the destination address of the first Service Node into the new extension header. In block 432, the Service Classifier forwards the IPv6 packet to the first Service Node based on the address in the routing extensions header.

At block 412, the first Service Node performs the requested service. If subsequent service nodes are required to perform a particular service, then at block 434, the first Service Node places the destination address of the second or next Service Node into the routing extensions header. At block 436, the first Service Node forwards the IPv6 packet to the next Service Node based on the routing extensions header.

At block 438, the last Service Node forwards the packet toward the destination based on the destination address. The last service node thus operates in a different manner with respect to packet forwarding based upon knowing that it is the last service node for a service, and that the approach of FIG. 4B is in use.

In this case, no tunneling is required but the routing header changes along the way and it is involved in the check-sum calculation. The routing header cannot be predefined for all Service Nodes in a chain because Service Node failure handling processes could be adversely affected.

FIG. 5A illustrates packet processing for IPv6 traffic when the flow label is used by a user application, in a first embodiment. FIG. 5B illustrates packet processing for IPv6 traffic when the flow label is used by a user application, in a second embodiment. The approaches of FIGS. 5A, 5B are appropriate in a networking environment in which the IPv6 flow label may be used by user applications.

Referring first to FIG. 5A, in block 502, the Service Classifier copies the flow label of the incoming IPv6 packet into a destination options extension header. In block 504, the Service Classifier places the service label into the flow label field of the IPv6 packet; thus, the flow label field in the main header is overwritten with the service label. In block 506, the packet is forwarded or routed to the Service Nodes using either the approach of FIG. 4A (block 508A), by changing the IPv6 destination address and keeping a record of the original destination address in the destination options extension header, or using the approach of FIG. 4B (block 508B) by inserting a routing extension header. At block 510, the last Service Node restores the flow label of the IPv6 packet from the destination options extension header and restores the original destination address if necessary. At block 512 the last Service Node forwards the IPv6 packet toward the destination. This option avoids the use of tunneling.

Referring to FIG. 5B, in an alternate approach the original IPv6 packet can be tunneled inside another IPv6 packet similar to the data plane implementation described above for IPv4 traffic. The flow label in the outer IPv6 main header can thus be used to carry the SIA service label. Since a tunneling mechanism is used in this case, the packet is routed to the Service Nodes based on the destination address of the outer IPv6 header.

In one embodiment, in block 520, the Service Classifier generates a new IPv6 packet and places the received IPv6 packet into the payload portion. In block 524, the Service Classifier places the service label into the flow label field, and places the address of the first Service Node in the destination address field, of the header of the outer IPv6 packet. In block 506, the IPv6 packet is forwarded to one or more Service Node(s) that can perform the service, using either the approach of FIG. 4A (508A) or FIG. 4B (508B).

At block 526, the last Service Node acts as a tunneled endpoint and extracts the tunneled IPv6 packet from the outer IPv6 packet. In block 528, the last Service Node forwards the extracted IPv6 packet toward the destination.

The approaches herein are operable in a variety of environments, including in the context of Windows end-points running Domain Isolation. RFC 2402 states that the flow-label is mutable, so it is not included in the IPSec Authentication Header calculation. The ESP-Null computation does not cover the main header so it does not include the flow-label. For these additional reasons, the flow label is suitable for implementing the approaches herein.

In the control plane, distribution of the service-labels to the Service Classifiers and Service Nodes can be performed using a variety of mechanisms, such as the Cisco Service Advertisement Framework. The approaches herein assume that service-label information is already available to the network elements involved in the processes described herein. The approaches herein are novel at least in using the IPv6 flow label and routing extension header to implement data plane aspects of a Service Insertion Architecture. The approaches herein provide the benefit of simplified deployment of SIA for both IPv4 and IPv6 traffic both of which will be delivered to the correct Service Nodes. Embodiments can be implemented, for example, in routers that are used at the access layer of a network and play the role of Service Classifiers in the SIA architecture. These functions can be implemented in a wide range of router platforms.

Network service providers or enterprises interested in deploying the SIA architecture can use the approaches herein. The approaches herein can enable implementation of SIA in current IPv4 networks in a manner that ensures operability in IPv6 networks that such service providers or enterprises may deploy at another time.

3.0 Implementation Mechanisms—Hardware Overview

Figure 6:
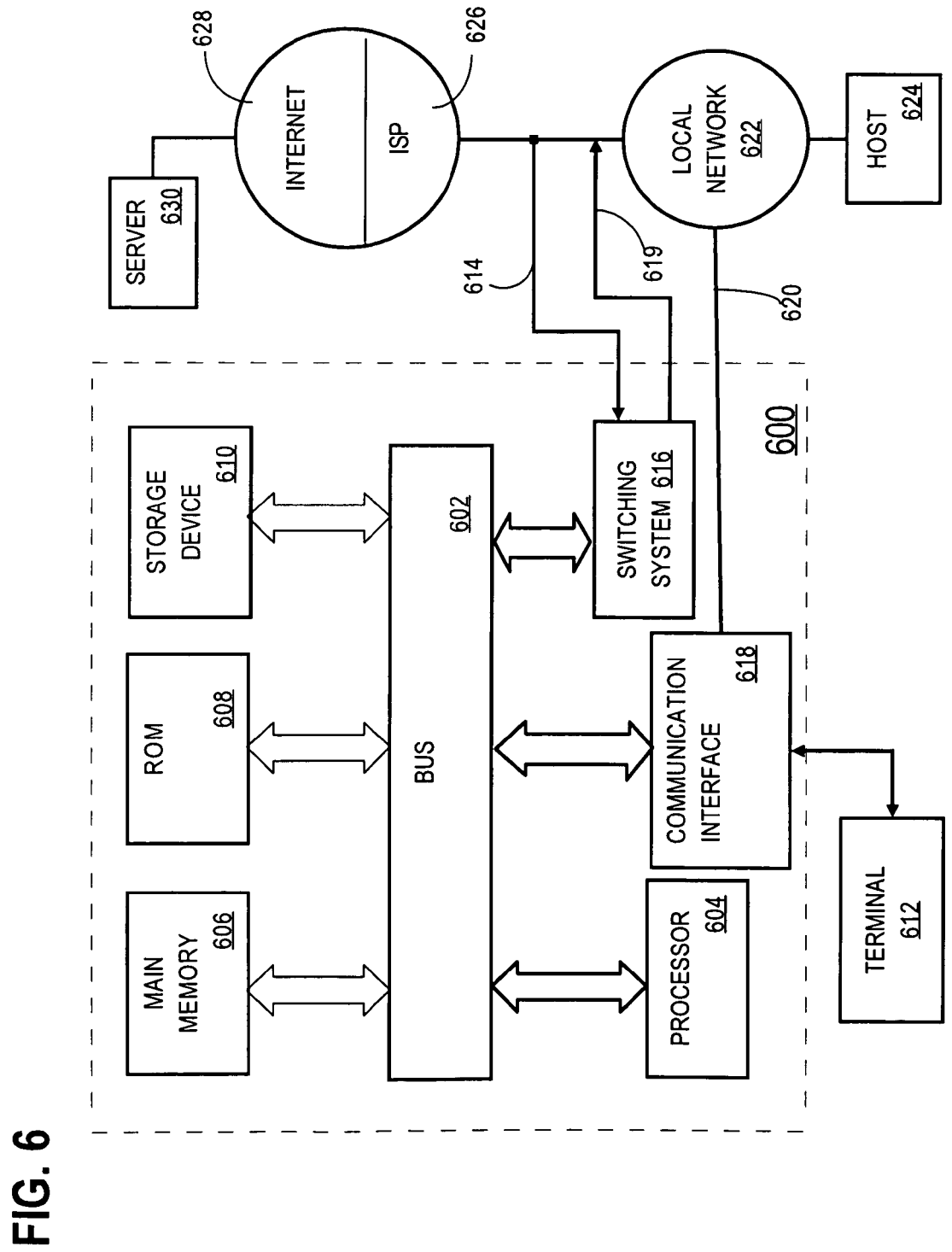
FIG. 6 illustrates a computer system that may be used to implement certain embodiments.

FIG. 6 is a block diagram that illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 614. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for the techniques herein. According to one embodiment of the invention, the techniques herein are provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile storage media, volatile storage media, and transmission media. Non-volatile storage media includes, for example, optical or magnetic disks, such as storage device 610. Volatile storage media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other tangible storage medium from which a computer can read.

Various forms of computer readable storage media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for the techniques herein as described herein.

The received code may be executed by processor 604 as it is received, and/or stored in storage device 610, or other non-volatile storage for later execution. In this manner, computer system 600 may obtain application code in the form of a carrier wave.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable data storage medium storing one or more sequences of instructions which, when executed by one or more processors, cause the one or more processors to perform:
    receiving, from a service broker, a service insertion architecture service label and an Internet Protocol version 6 (IPv6) address of a first service node;
    receiving, from a network node that uses Internet Protocol version 4 (IPv4), an IPv4 packet requesting a service associated with the first service node;
    creating an IPv6 packet comprising the service insertion architecture service label in a Flow Label field of the IPv6 packet, the IPv6 address of the first service node in a destination address field of the IPv6 packet, and the IPv4 packet in a payload field of the IPv6 packet;
    forwarding the IPv6 packet to the first service node and causing the first service node to perform:
        extracting the IPv4 packet;
        performing the service using the IPv4 packet, resulting in creating a modified IPv4 packet;
        creating a second IPv6 packet comprising the service insertion architecture service label in a Flow Label field of the second IPv6 packet, a second IPv6 address of a second service node in a destination address field of the second IPv6 packet, and the modified IPv4 packet in a payload field of the second IPv6 packet;
        forwarding the second IPv6 packet to the second service node, or forwarding the second IPv6 packet to a service classifier, or dropping the second IPv6 packet.

2. A non-transitory computer-readable data storage medium storing one or more sequences of instructions which, when executed by one or more processors, cause the one or more processors to perform:
    receiving, from a service broker, a service insertion architecture header, comprising service label, and an Internet Protocol version 6 (IPv6) address of a first service node;
    receiving an IPv6 packet requesting a service associated with the first service node;
    modifying the IPv6 packet by placing the service insertion architecture header, comprising the service label, in a Flow Label field of the IPv6 packet and by redirecting a destination address of the IPv6 packet;
    forwarding the IPv6 packet to the first service node and causing the first service node to perform:
        performing the service using the IPv6 packet, resulting in creating a modified IPv6 packet;

placing a second IPv6 address of a second service node in the destination address field of the modified IPv6 packet;

forwarding the modified IPv6 packet to the second service node;

at the second service node:

moving the destination address of the IPv6 packet from a destinations option extension header to the destination address field of the IPv6 packet;

forwarding the IPv6 packet to a destination node identified by the destination address.

3. The non-transitory computer-readable storage medium of claim 2, wherein the instructions which when executed cause the modifying by the redirecting the destination address further comprise instructions which when executed by the one or more processors cause the one or more processors to perform inserting the destinations option extension header, placing the destination address of the IPv6 packet in the destinations option extension header, and placing the IPv6 address of the first service node in the destination address field of the IPv6 packet.

4. The non-transitory computer-readable storage medium of claim 2, wherein the instructions which when executed cause the modifying by the redirecting the destination address further comprise instructions which when executed by the one or more processors cause the one or more processors to perform inserting a routing extension header comprising the IPv6 address of the first service node.

5. The non-transitory computer-readable storage medium as recited in claim 2, further comprising instructions which when executed by the one or more processors cause the one or more processors to perform:

creating, in the IPv6 packet, a destination options extension header and copying a flow label value from the flow label field into the destination options extension header;

at a last service node: copying the flow label value from the destination options extension header into the flow label field and forwarding the IPv6 packet to the destination address.

6. The non-transitory computer-readable storage medium as recited in claim 3, further comprising instructions which when executed by the one or more processors cause the one or more processors to perform:

creating, in the IPv6 packet, a destination options extension header and copying a flow label value from the flow label field into the destination options extension header;

at a last service node: copying the flow label value from the destination options extension header into the flow label field and forwarding the IPv6 packet to the destination address.

7. The non-transitory computer-readable storage medium as recited in claim 4, further comprising instructions which when executed by the one or more processors cause the one or more processors to perform:

creating, in the IPv6 packet, a destination options extension header and copying a flow label value from the flow label field into the destination options extension header;

at a last service node: copying the flow label value from the destination options extension header into the flow label field and forwarding the IPv6 packet to the destination address.

8. The non-transitory computer-readable storage medium as recited in claim 2, further comprising instructions which when executed by the one or more processors cause the one or more processors to perform:

creating an additional IPv6 packet for use in tunneling the IPv6 packet;

placing the service label in a flow label field of a header of the additional IPv6 packet;

placing the destination address of the first service node in a destination address field of the header of the additional IPv6 packet.

9. The non-transitory computer-readable storage medium as recited in claim 3, further comprising instructions which when executed by the one or more processors cause the one or more processors to perform:

creating an additional IPv6 packet for use in tunneling the IPv6 packet;

placing the service label in a flow label field of a header of the additional IPv6 packet;

placing the destination address of the first service node in a destination address field of the header of the additional IPv6 packet.

10. The non-transitory computer-readable storage medium as recited in claim 4, further comprising instructions which when executed by the one or more processors cause the one or more processors to perform:

creating an additional IPv6 packet for use in tunneling the IPv6 packet;

placing the service label in a flow label field of a header of the additional IPv6 packet;

placing the destination address of the first service node in a destination address field of the header of the additional IPv6 packet.

11. A data processing apparatus, comprising:

one or more processors;

a switching system coupled to the one or more processors and configured to receive one or more packets, determine respective destinations for the one or more packets, and to switch, route or forward the one or more packets to the respective destinations;

a computer-readable data storage medium coupled to the one or more processors and storing one or more sequences of instructions which, when executed by the one or more processors, cause the one or more processors to perform:

receiving, from a service broker, a service insertion architecture service label and an Internet Protocol version 6 (IPv6) address of a first service node;

receiving, from a network node that uses Internet Protocol version 4 (IPv4), an IPv4 packet requesting a service associated with the first service node;

creating an IPv6 packet comprising the service label in a Flow Label field of the IPv6 packet, the IPv6 address of the first service node in a destination address field of the IPv6 packet, and the IPv4 packet in a payload field of the IPv6 packet;

forwarding the IPv6 packet to the first service node and causing the first service node to perform:

extracting the IPv4 packet;

performing the service using the IPv4 packet, resulting in creating a modified IPv4 packet;

creating a second IPv6 packet comprising the service label in a Flow Label field of the second IPv6 packet, a second IPv6 address of a second service node in a destination address field of the second IPv6 packet, and the modified IPv4 packet in a payload field of the second IPv6 packet;

forwarding the second IPv6 packet to the second service node, or forwarding the second IPv6 packet to a service classifier, or dropping the second IPv6 packet.

12. A data processing apparatus, comprising:
one or more processors;
a switching system coupled to the one or more processors and configured to receive one or more packets, determine respective destinations for the one or more packets, and to switch, route or forward the one or more packets to the respective destinations;
a computer-readable data storage medium storing one or more sequences of instructions which, when executed by the one or more processors, cause the one or more processors to perform:
receiving, from a service broker, a service insertion architecture service label and an Internet Protocol version 6 (IPv6) address of a first service node;
receiving an IPv6 packet requesting a service associated with the first service node;
modifying the IPv6 packet by placing the service header data in a Flow Label field of the IPv6 packet and by redirecting a destination address of the IPv6 packet;
forwarding the IPv6 packet to the first service node and causing the first service node to perform:
performing the service using the IPv6 packet, resulting in creating a modified IPv6 packet;
placing a second IPv6 address of a second service node in the destination address field of the modified IPv6 packet;
forwarding the modified IPv6 packet to the second service node;
at the second service node:
moving the destination address of the IPv6 packet from a destinations option extension header to the destination address field of the IPv6 packet;
forwarding the IPv6 packet to a destination node identified by the destination address.

13. The apparatus of claim 12, wherein the instructions which when executed cause the modifying by the redirecting the destination address further comprise instructions which when executed by the one or more processors cause the one or more processors to perform inserting the destinations option extension header, placing the destination address of the IPv6 packet in the destinations option extension header, and placing the IPv6 address of the first service node in the destination address field of the IPv6 packet.

14. The apparatus of claim 12, wherein the instructions which when executed cause the modifying by the redirecting the destination address further comprise instructions which when executed by the one or more processors cause the one or more processors to perform inserting a routing extension header comprising the IPv6 address of the first service node.

15. The apparatus as recited in claim 12, further comprising instructions which when executed by the one or more processors cause the one or more processors to perform:
creating, in the IPv6 packet, a destination options extension header and copying a flow label value from the flow label field into the destination options extension header;
at a last service node: copying the flow label value from the destination options extension header into the flow label field and forwarding the IPv6 packet to the destination address.

16. The apparatus as recited in claim 13, further comprising instructions which when executed by the one or more processors cause the one or more processors to perform:
creating, in the IPv6 packet, a destination options extension header and copying a flow label value from the flow label field into the destination options extension header;
at a last service node: copying the flow label value from the destination options extension header into the flow label field and forwarding the IPv6 packet to the destination address.

17. The apparatus as recited in claim 13, further comprising instructions which when executed by the one or more processors cause the one or more processors to perform:
creating, in the IPv6 packet, a destination options extension header and copying a flow label value from the flow label field into the destination options extension header;
at a last service node: copying the flow label value from the destination options extension header into the flow label field and forwarding the IPv6 packet to the destination address.

18. The apparatus recited in claim 12, further comprising instructions which when executed by the one or more processors cause the one or more processors to perform:
creating an additional IPv6 packet for use in tunneling the IPv6 packet;
placing the service label in a flow label field of a header of the additional IPv6 packet;
placing the destination address of the first service node in a destination address field of the header of the additional IPv6 packet.

19. The apparatus recited in claim 13, further comprising instructions which when executed by the one or more processors cause the one or more processors to perform:
creating an additional IPv6 packet for use in tunneling the IPv6 packet;
placing the service label in a flow label field of a header of the additional IPv6 packet;
placing the destination address of the first service node in a destination address field of the header of the additional IPv6 packet.

20. The apparatus recited in claim 13, further comprising instructions which when executed by the one or more processors cause the one or more processors to perform:
creating an additional IPv6 packet for use in tunneling the IPv6 packet;
placing the service label in a flow label field of a header of the additional IPv6 packet;
placing the destination address of the first service node in a destination address field of the header of the additional IPv6 packet.

21. A computer-implemented method, comprising:
receiving, from a service broker, a service insertion architecture service label and an Internet Protocol version 6 (IPv6) address of a first service node;
receiving, from a network node that uses Internet Protocol version 4 (IPv4), an IPv4 packet requesting a service associated with the first service node;
creating an IPv6 packet comprising the service label in a Flow Label field of the IPv6 packet, the IPv6 address of the first service node in a destination address field of the IPv6 packet, and the IPv4 packet in a payload field of the IPv6 packet;
forwarding the IPv6 packet to the first service node and causing the first service node to perform:
receiving, from a service broker, a service insertion architecture service label and an Internet Protocol version 6 (IPv6) address of a first service node;
receiving an IPv6 packet requesting a service associated with the first service node;
modifying the IPv6 packet by placing the service header data in a Flow Label field of the IPv6 packet and by redirecting a destination address of the IPv6 packet;
forwarding the IPv6 packet to the first service node;

wherein the method is performed by one or more computing devices.

22. The method of claim 21, further comprising inserting the destinations option extension header, placing the destination address of the IPv6 packet in the destinations option extension header, and placing the IPv6 address of the first service node in the destination address field of the IPv6 packet.

23. The method of claim 21, further comprising inserting a routing extension header comprising the IPv6 address of the first service node.

* * * * *